INVENTOR:
BRUNO SILLER

United States Patent Office 3,306,781
Patented Feb. 28, 1967

3,306,781
DEPOLARIZER MIXTURE AND MOLDED BODIES
Bruno Siller, Ellwangen (Jagst), Germany, assignor to Varta Pertrix-Union Gesellschaft mit beschraenkter Haftung, Ellwangen (Jagst), Germany, a corporation of Germany
Filed June 19, 1964, Ser. No. 376,332
Claims priority, application Germany, June 28, 1963, V 24,238
18 Claims. (Cl. 136—138)

The present invention relates to improvements in depolarizer mixtures and to improved methods for their manufacture. It is more particularly concerned with depolarizer mixtures for galvanic elements of the Leclanché-type, i.e. with depolarizer mixtures containing manganese dioxide, carbon black, polyisobutylene, and/or rubber and in most cases also solid, comminuted ammonium chloride. Such depolarizer mixtures can be compressed to molded bodies which absorb liquid electrolyte on immersion thereinto without losing their firm cohesion and shape.

It has been proposed to produce molded depolarizer bodies composed of a mixture of manganese dioxide, carbon black and/or graphite by pasting said mixture with a solution of polyisobutylene in refined petroleum or trichloro ethylene but without the addition of electrolyte solution. Most of the solvent is then allowed to evaporate and the still slightly moist paste is molded to depolarizer bodies. After drying, these depolarizer bodies must be immersed into the electrolyte solution so as to absorb the same. The absorbed electrolyte is required for the generation of electric current. Experience, however, has shown that absorption of electrolyte by depolarizer bodies produced in this manner is rather difficult, especially when using dense manganese dioxide such as, for instance, natural or electrolytically prepared manganese dioxide. Electrolyte absorption of bodies prepared from such manganese dioxides is unsatisfactory so that poor discharge results are achieved when using such bodies in galvanic cells.

It is one object of this invention to overcome these disadvantages by providing novel depolarizer mixtures.

Another object of this invention is to provide novel and valuable depolarizer mixtures for galvanic elements of the Leclanché type.

A further object of this invention is to provide novel and valuable depolarizer mixtures which can readily be molded to molded bodies.

Another object of this invention is to provide a simple and effective method of preparing depolarizer mixtures for galvanic elements and especially for galvanic elements of the Leclanché type.

Other objects of the present invention and advantageous features thereof will become apparent as the description proceeds.

The above and other objects are accomplished in accordance with the invention by preparing a depolarizer mixture in such a manner that the manganese dioxide particles are bonded by means of polyisobutylene and/or rubber while the predominant portion of the carbon black particles are present in unbounded form, i.e. are not bonded by means of polyisobutylene and/or rubber.

According to the present invention the depolarizer mixture is prepared by first pasting manganese dioxide with or without a small amount of carbon black and with or without solid, comminuted ammonium chloride with a solution of polyisobutylene or rubber dissolved in a suitable solvent such as refined petroleum or trichloro ethylene. The solvent is then evaporated and the dried residue is finely comminuted.

The addition of small amounts of carbon black or pulverulent ammonium chloride to the manganese dioxide facilitates disintegration of the manganese dioxide powder after the treatment with the polyisobutylene solution or the rubber solution and favorably affects the strength properties of the resulting bodies. Therefore, it is the preferred procedure to add such small amounts of carbon black and ammonium chloride. Graphite may be added to the mixture either before pasting with the polyisobutylene and/or rubber solution or after drying the pasted mixture.

If the mixture does not contain ammonium chloride, pulverulent ammonium chloride is added to the dry powder resulting from the treatment of manganese dioxide with polyisobutylene or rubber. Actylene carbon black in the usual amount is added and mixed in the dry state with the depolarizer mixture. An amount of electrolyte solution corresponding to the absorption capacity of the resulting depolarizer mixture is added and thoroughly mixed therewith. The resulting mixture is compressed and molded to depolarizer molded bodies such as plates and bobbins according to known methods. The plates can be made very thin and with a large surface area because the resulting compressed bodies possess excellent strength properties. The plates, for instance, can be glued broadside on to both sides of a metal sheet, protected on both sides by conductive foils, by means of a weak polyisobutylene solution and are then saturated with electrolyte by immersing the plates in the electrolyte solution. It is advisable to subsequently saturate the plates with electrolyte solution because the compressed bodies possess a certain elasticity and are able to absorb additional electrolyte after molding and shaping.

Polyisobutylene of a molecular weight of about 200,000 is the best suitable bonding material although polyisobutylene of a molecular weight between about 50,000 and about 200,000 may be used for this purpose. The amount of polyisobutylene added should not exceed about 5% of the manganese dioxide present in the body, and is preferably between about 1% and about 3%.

The essential characteristic properties of the depolarizer mixture according to the present invention will hereinafter be described briefly.

As stated above, it is an essential feature of the present invention not to treat the entire mixture with the polyisobutylene solution but to leave a substantial portion of the acetylene carbon black in untreated form, and to admix said untreated carbon black in a second mixing step to the polyisobutylene-treated premix. As will be shown by the following experiments, polyisobutylene is strongly absorbed by carbon black added to the solution. As a result thereof the water-binding power of carbon black is lost. However, this ability of carbon black to bind water is essential for proper impregnation of the depolarizer body with aqueous electrolyte. Therefore, the main portion of the carbon black is added to the mixture pre-treated with polyisobutylene solution, after it has been dried and comminuted.

Thus two kinds of carbon black are to be distinguished in the finished depolarizer mixture, namely:
(1) Free, unbonded carbon black and
(2) If desired, a relative small amount of carbon black particles bonded by polyisobutylene or rubber.

These two different kinds of carbon black can readily be separated from and identified in the depolarizer mixture after dissolving out the manganese dioxide. The unbonded carbon black forms a stable suspension with a soap solution while the bonded carbon black settles in said solution. The amount of bonded carbon black which is treated with polyisobutylene solution together with the manganese dioxide, preferably should not exceed about 4%, calculated for manganese dioxide. It may, however, be completely omitted, i.e. the depolarizer mixture may be free of carbon black bonded with polyisobutylene.

The mixture treated with polyisobutylene solution which predominantly contains manganese dioxide must be dried thoroughly after such a treatment so as to permit its comminution. Drying for about one hour at about 80° C. has proved to be sufficient.

The resulting dried mixture is pulverized whereby exposure to pressure is to be avoided as far as possible. The pulverized mixture is sieved, moistened with electrolyte solution, and compressed to the desired shape. Such a depolarizer mixture can readily be compressed to molded bodies, which have excellent strength and firmness and, on immersion into the eelctrolyte solution, absorb the amount of the electrolyte required for satisfactory operation of the cells without losing their firm cohesion. The electrolyte content of the impregnated compressed bodies is about 35%, by volume.

It may be pointed out that an especially important advantage of the present invention is the possibility of producing depolarizer plates of considerable thickness up to 10 mm. and even more. This was not possible according to the methods used heretofore. Even when using highly voluminus manganese dioxide only plates of less than 2 mm. thickness could be produced because of the unsatisfactory permeability of the plates. According to the present invention, however, it is possible to produce plates of 5 mm. to 10 mm. thickness and even thicker plates whereby dense manganese dioxide may be used and the use of highly voluminous material is not necessary. Plates of such a thickness are, of course, of special importance, for larger batteries.

The invention will be more fully described by the accompanying drawings, without, however, being in any way limited to the illustrated examples. In the drawings, FIG. 1 illustrates a positive electrode according to the present invention;

Figure 1:
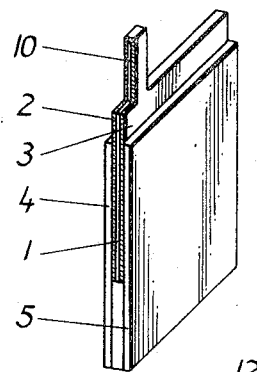
Figure 2:
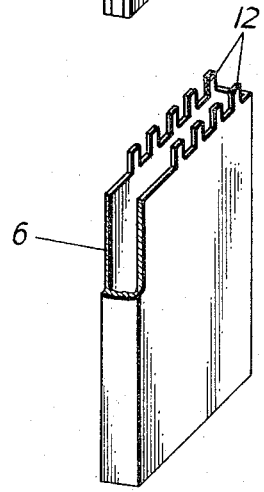
FIG. 2 illustrates the zinc container for such an electrode.

The positive electrode of FIG. 1 is composed of a thin zinc metal sheet 1 which is covered on both sides by conductive foils 2 and 3. These foils consist of plastic material which have been rendered conductive by the addition of graphite. The depolarizer plates 4 and 5 prepared according to the present invention are pressed onto said conductive foils 2 and 3. The resulting electrode is immersed in electrolyte and placed into zinc container 6. Said container 6 has the form of a flat encasing envelope as shown in FIG. 2. Container 6 contains electrolyte 13 to which a conventional thickening agent such as starch or flour is added to cause gel formation.

Figure 3:
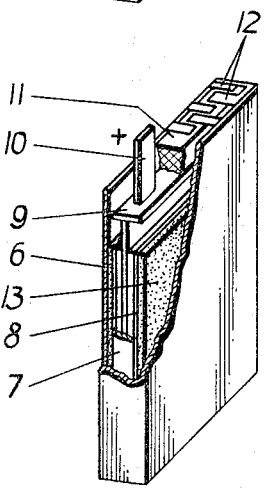
FIG. 3 illustrates the complete battery cell, partly in section.

FIG. 3 illustrates a complete cell whereby the container is partly removed to show its contents in detail. A U-shaped plastic band 7 covers the narrow walls of zinc container 6 and prevents short circuit between the inserted electrode according to this invention and zinc container 6. FIG. 3 also shows paper wrapping 8 which encloses the positive electrode and also serves to prevent short circuit between the electrode and the walls of zinc container 6, should the electrode be laterally displaced. The cell is closed at the top by cover plate 9 and is sealed by sealing composition 11 consisting, for instance, of bitumen, pitch or the like.

A special feature of the illustrated cell is the provision of tooth-like extensions 12 provided at the upper edges of container 6. These extensions are bent at a right angle, after applying to cover plate 9 the top closure composition 11, and are impressed into the top closure composition. In this manner it is assured that container 6 attains a rigid shape and that its upper walls will not spread apart. Lug 10 serves as current conductor.

The following examples serve to illustrate the present invention without, however, limiting the same thereto. Of these examples, Example 1 illustrates the preparation of a depolarizer mixture prepared according to the state of the art, i.e. by a process consisting in bonding manganese dioxide and the total amount of carbon black with polyisobutylene. Examples 2 to 5, in contrast thereto, are carried out according to the present invention.

*Example 1*

When proceeding in the conventional manner, a depolarizer plate is produced by mixing 1 g. of polyisobutylene, dissolved in 30 cc. of refined petroleum,
7 g. of acetylene carbon black,
35 g. of electrolytically prepared manganese dioxide, and
4 g. of finely comminuted ammonium chloride.

Most of the refined petroleum is then evaporated and the resulting mixture which is still moistened by refined petroleum is compressed to the depolarizer plate. The plate is then impregnated with the electrolyte solution which contains 250 g. of ammonium chloride per liter.

*Example 2*

According to the present invention, a depolarizer mixture is prepared by thoroughly mixing 1 g. of polyisobutylene dissolved in 30 cc. of refined petroleum,
2 g. of acetylene carbon black,
60 g. of electrolytically prepared manganese dioxide, and
8 g. of finely comminuted ammonium chloride.

The refined petroleum is then completely removed by evaporation. The residue is dried at 80° C. for one hour and is finely comminuted. The resulting mixture is pasted by the addition of 9 g. of acetylene carbon black and 10 cc. of an electrolyte solution which contains 250 g. of ammonium chloride per liter. The resulting mixture is then compressed to the depolarizer plate. Such plates possess a certain elasticity and are able to absorb additional electrolyte solution after molding, when they are immersed in such a solution.

*Example 3*

According to the present invention, a depolarizer mixture is prepared by thoroughly mixing 1 g. of polyisobutylene dissolved in 30 cc. of refined petroleum and 60 g. of electrolytically prepared manganese dioxide. The refined petroleum is completely evaporated. The mixture is dried at 80° C. for one hour and is then finely comminuted. To the thus pretreated manganese dioxide there are admixed 11 g. of acetylene carbon black, 8 g. of ammonium chloride, and 10 cc. of the electrolyte solution of Example 2. The resulting mixture yields, on molding, highly effective and stable depolarizer plates which are impregnated with additional amounts of electrolyte solution.

*Example 4*

According to the present invention, a depolarizer mixture is prepared by thoroughly mixing 1 g. of rubber dissolved in 30 cc. of refined petroleum, 2 g. of acetylene carbon black, 60 g. of electrolytically prepared manganese dioxide, and 8 g. of comminuted ammonium chloride. The refined petroleum is then completely evaporated. The residue is dried at 80° C. for one hour and finely comminuted. The resulting pretreated manganese dioxide is mixed with 9 g. of acetylene carbon black and 10 cc. of an electrolyte solution containing 250 g. of ammonium chloride per liter. The mixture is compressed to depolarizer plates which are impregnated with additional amounts of said electrolyte solution.

Example 5

According to the present invention, a depolarizer mixture is prepared by thoroughly mixing 1 g. of rubber dissolved in 30 cc. of refined petroleum, and 60 g. of electrolytically prepared manganese dioxide. The refined petroleum is then completely evaporated. The mixture is dried at 80° C. for one hour and finely comminuted. The thus pretreated manganese dioxide is mixed with 11 g. of acetylene carbon black, 8 g. of ammonium chloride, and 10 cc. of the electrolyte solution of Example 2. The resulting mixture is molded to depolarizer plates which are impregnated with additional electrolyte solution.

As stated above, the depolarizer plates produced according to the present invention are superior in their capacity to those prepared according to known methods. This is proved by the following comparative tests, which show that the capacity of the depolarizer plates of the present invention is very considerably higher than that of depolarizer plates made according to known methods.

TABLE 1

|  | Plate according to Example 1 | Plate according to Example 2 |
| --- | --- | --- |
| Electrolyte content | 10%, by volume | 35%, by volume. |
| Short circuit current | 13 amp | 41 amp. |

TABLE 2.—DISCHARGE VALUES ON DISCHARGING OVER A RESISTANCE OF 20 OHMS 4 HOURS DAILY

| Hours | Plate according to Example 1, Volt | Plate according to Example 2, Volt |
| --- | --- | --- |
| 0 | 1.60 | 1.72 |
| 4 | 1.31 | 1.47 |
| 8 | 1.18 | 1.43 |
| 12 | 1.11 | 1.39 |
| 16 | 1.05 | 1.35 |
| 20 | 1.01 | 1.30 |
| 24 | 0.96 | 1.23 |
| 28 | 0.91 | 1.11 |
| 32 | 0.87 | 0.98 |
| 36 | 0.78 | 0.92 |
| 40 |  | 0.84 |

It may be mentioned that the short circuit current is of considerable importance for many uses.

It is understood that other electrolytes than electrolytes containing ammonium chloride, such as electrolytes containing zinc chloride, magnesium chloride, earth alkali metal chlorides and alkali hydroxides may be employed whereby the same advantageous increase in capacity is achieved.

Of course, many changes and variations in the componest of the depolarizer plates and their proportions in the manufacturing conditions, for instance, temperature, in the solvents and electrolyte solutions used, in the methods of comminuting and molding the depolarizer mixture, and the like may be made by those skilled in the art in accordance with the principles set forth herein and the claims annexed thereto.

I claim:

1. Depolarizer mixture for primary elements comprising manganese dioxide, carbon black, and a binding agent selected from the group consisting of polyisobutylene and rubber, the manganese dioxide particles in said mixture being bound by said binding agent, at least the predominant part of said carbon black being present in said mixture in the free state and not bound by said binding agent.

2. Depolarizer mixture for primary elements comprising manganese dioxide, carbon black, and a binding agent selected from the group consisting of polyisobutylene and rubber, the manganese dioxide particles in said mixture being bound by said binding agent, at least the predominant part of said carbon black being present in said mixture in the free state and not bound by said binding agent, the amount of said binding agent being less than about 5%, by weight, of said manganese dioxide.

3. Depolarizer mixture for primary elements comprising manganese dioxide, carbon black, and a binding agent selected from the group consisting of polyisobutylene and rubber, the manganese dioxide particles in said mixture being bound by said binding agent, at least the predominant part of said carbon black being present in said mixture in the free state and not bound by said binding agent, the amount of said binding agent being between about 1% and about 3%, by weight, of said manganese dioxide.

4. Depolarizer mixture for primary elements comprising manganese dioxide, carbon black, and a binding agent selected from the group consisting of polyisobutylene and rubber, the manganese dioxide particles in said mixture being bound by said binding agent, at least the predominant part of said carbon black being present in said mixture in the free state and not bound by said binding agent, said depolarizer mixture containing electrolyte solution in an amount corresponding to the absorption capacity of said depolarizer mixture.

5. Depolarizer mixture for primary elements comprising manganese dioxide, carbon black, and a binding agent selected from the group consisting of polyisobutylene and rubber, the manganese dioxide particles in said mixture being bound by said binding agent, at least the predominant part of said carbon black being present in said mixture in the free state and not bound by said binding agent, the amount of said binding agent being less than about 5%, by weight, of said manganese dioxide, said depolarizer mixture containing electrolyte solution in an amount corresponding to the absorption capacity of said depolarizer mixture.

6. Depolarizer mixture for primary elements comprising manganese dioxide, carbon black, and a binding agent selected from the group consisting of polyisobutylene and rubber, the manganese dioxide particles in said mixture being bound by said binding agent, at least the predominant part of said carbon black being present in said mixture in the free state and not bound by said binding agent, the amount of said binding agent being between about 1% and about 3%, by weight, of said manganese dioxide, said depolarizer mixture containing electrolyte solution in an amount corresponding to the absorption capacity of said depolarizer mixture.

7. Depolarizer mixture for primary elements comprising manganese dioxide, carbon black, and a binding agent selected from the group consisting of polyisobutylene and rubber, the manganese dioxide particles in said mixture being bound by said binding agent and the carbon black being present in said mixture in the free state and not bound by said binding agent.

8. Depolarizer mixture for primary elements comprising manganese dioxide, carbon black, and a binding agent selected from the group consisting of polyisobutylene and rubber, the manganese dioxide particles in said mixture being bound by said binding agent and the carbon black being present in said mixture in the free state and not bound by said binding agent, said depolarizer mixture containing electrolyte solution in an amount corresponding to the absorption capacity of said depolarizer mixture.

9. Depolarizer mixture for primary elements comprising manganese dioxide, carbon black, ammonium chloride, and a binding agent selected from the group consisting of polyisobutylene and rubber, the manganese dioxide particles in said mixture being bound by said binding agent and at least the predominant part of said carbon black being present in said mixture in the free state and not bound by said binding agent.

10. Molded firm and stable depolarizer body for primary elements comprising manganese dioxide, carbon black, and a binding agent selected from the group consisting of polyisobutylene and rubber, the manganese dioxide particles in said mixture being bound by said binding agent, at least the predominant part of said carbon black being present in said mixture in the free state and not bound by said binding agent, said depolarizer body having absorbed therethrough electrolyte solution in an amount corresponding to the absorption capacity of said depolarizer body.

11. The molded depolarizer body according to claim 10, in the form of a firm and stable plate.

12. The molded depolarizer body according to claim 10, wherein the amount of said binding agent is less than about 5%, by weight, of said manganese dioxide.

13. The molded depolarizer body of claim 12 in the form of a firm and stable plate.

14. Molded firm and stable depolarizer body for primary elements comprising manganese dioxide, carbon black, and a binding agent selected from the group consisting of polyisobutylene and rubber, the manganese dioxide particles in said mixture being bound by said binding agent, at least the predominant part of said carbon black being present in said mixture in the free state and not bound by said binding agent, said depolarizer body having absorbed therethrough not less than about 35%, by volume, of electrolyte solution.

15. The molded depolarizer body of claim 14 in the form of a firm and stable plate.

16. Molded firm and stable depolarizer body for primary elements comprising manganese dioxide, carbon black, and a binding agent selected from the group consisting of polyisobutylene and rubber, the manganese dioxide particles in said mixture being bound by said binding agent and the carbon black being present in said body in the free state and not bound by said binding agent, said depolarizer body having absorbed therethrough electrolyte solution in an amount corresponding to the absorption capacity of said depolarizer body.

17. The molded depolarizer body according to claim 16, wherein the amount of said binding agent is less than about 5%, by weight, of said manganese dioxide.

18. The molded depolarizer body of claim 17 in the form of a firm and stable plate.

References Cited by the Examiner

UNITED STATES PATENTS

| 1,874,748 | 8/1932 | Henderson | 136—123 |
| 3,113,050 | 12/1963 | Kordesch et al. | 136—123 |
| 3,184,339 | 5/1965 | Ellis | 136—6 X |

WINSTON A. DOUGLAS, *Primary Examiner.*

D. L. WALTON, *Assistant Examiner.*